(12) United States Patent
Wingen

(10) Patent No.: US 6,621,293 B2
(45) Date of Patent: Sep. 16, 2003

(54) INTEGRATED CIRCUIT ARRANGEMENT WITH FEATURE CONTROL

(75) Inventor: Neal T. Wingen, Algonquin, IL (US)

(73) Assignee: Koninklijke Philips Electronics N.V., Eindhoven (NL)

(*) Notice: Subject to any disclaimer, the term of this patent is extended or adjusted under 35 U.S.C. 154(b) by 148 days.

(21) Appl. No.: 09/871,231

(22) Filed: May 31, 2001

(65) Prior Publication Data
US 2002/0181641 A1 Dec. 5, 2002

(51) Int. Cl.[7] .................................................. G06F 7/38
(52) U.S. Cl. .............................. 326/37; 326/38; 326/41
(58) Field of Search ..................................... 326/37–41

(56) References Cited

U.S. PATENT DOCUMENTS 6,011,407 A * 1/2000 New ............................ 326/39
6,237,054 B1 * 5/2001 Freitag, Jr. ................... 710/72

* cited by examiner

*Primary Examiner*—Anh Tran
(74) *Attorney, Agent, or Firm*—Peter Zawilski

(57) ABSTRACT

An integrated circuit arrangement is reconfigurable in the field to operate in one of a plurality of modes, including a test mode, in response to mode-selecting codes presented via a temporary register in the circuit. In one example embodiment, an arrangement of integrated circuits includes a reconfigurable integrated circuit configured and arranged to operate in one of a plurality of modes. The reconfigurable integrated circuit includes a register adapted to store data for temporary use, with each operating mode of the reconfigurable circuit being selectable in response to mode-selecting data code. An interface circuit is electrically connected to the reconfigurable integrated circuit and is adapted to present the mode-selecting data code to the reconfigurable integrated circuit. A selection circuit is adapted to enable the interface circuit to pass mode-selecting data to the reconfigurable integrated circuit. The selection circuit is also adapted to detect when a series of data writes to the register corresponds to the mode-selecting data code and, in response, to reconfigure the integrated circuit to operate in one of the plurality of modes.

14 Claims, 2 Drawing Sheets

INTEGRATED CIRCUIT ARRANGEMENT WITH FEATURE CONTROL

FIELD OF THE INVENTION

The present device relates generally to integrated circuit devices and, in particular, to an integrated circuit arrangement that is reconfigurable to operate in alternate modes, for use with various CPUs and peripherals.

BACKGROUND OF THE INVENTION

Programmable integrated circuit devices have long played a key role in the design of digital hardware. Most are general-purpose chips that can be configured for a wide variety of applications. Some of these integrated circuit devices include, for example, Programmable Read-only Memory (PROM), Erasable Read-only Memory (EPROM), Programmable Logic Devices (PLDs), Field Programmable Gate Arrays (FPGAs) and Mask Programmable Gate Arrays (MPGAs).

FPGAs, in particular, are not only programmable but are actually computing integrated circuit devices that can implement virtually any digital circuit in hardware. FPGAs provide an end user with ability to directly configure the logic structure on the chip without the need for an integrated circuit fabrication facility. FPGAs can also be reprogrammed simply by loading them with a different "hardware program." The reprogramming feature of the FPGA facilitates implementing many processing algorithms with performance that simulates dedicated hardware while retaining the flexibility of dynamically reconfiguring the implementation when necessary. However, re-programming is time consuming and, depending on the application, using FPGAs can be expensive.

Another integrated circuit device used in computing is a universal asynchronous receiver/transmitter (UART) device. A UART is a data communications device that performs parallel-to-serial conversion of digital data. A UART communicates between parallel and serial forms by converting received data between parallel I/O devices, such as a local CPU, and serial I/O devices, such as POTS modems or other transmission lines. Most traditional UART devices can be programmed to operate at a selected baud rate, and the newer generation UARTs handle data communication more efficiently, to a great extent due to larger FIFO depths and improved flow control (fewer retries required and fewer waits for the internal FIFO to fill or empty). However, for many applications, reprogramming the functionality of a UART device in the field can be problematic because most of the hardwire connections of the UART are permanently configured at the factory before the device is shipped.

It would be highly desirable to have an arrangement of integrated circuits that is reconfigurable in the field to operate in alternate modes without adding additional hardware or expense.

SUMMARY OF THE INVENTION

Various aspects of the present invention are directed to facilitating efforts to reconfigure integrated circuit device functionality in the field. The present invention is exemplified in a number of implementations and applications, some of which are summarized below.

According to an example embodiment of the present invention, an arrangement of integrated circuits includes a reconfigurable integrated circuit configured and arranged to operate in one of a plurality of modes. The reconfigurable integrated circuit includes a register adapted to store data for temporary use, with each operating mode of the reconfigurable circuit being selectable in response to mode-selecting data code. An interface circuit is electrically connected to the reconfigurable integrated circuit and is adapted to present the mode-selecting data code to the reconfigurable integrated circuit. A selection circuit is adapted to enable the interface circuit to pass mode-selecting data to the reconfigurable integrated circuit. The selection circuit is also adapted to detect when a series of data writes to the register corresponds to the mode-selecting data code and, in response, to reconfigure the integrated circuit to operate in one of the plurality of modes.

A more particular implementation of the present invention provides a security feature that prohibits unauthorized attempts to reconfigure the integrated circuit when the selection circuit and the register do not detect an operative mode-selecting data code.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
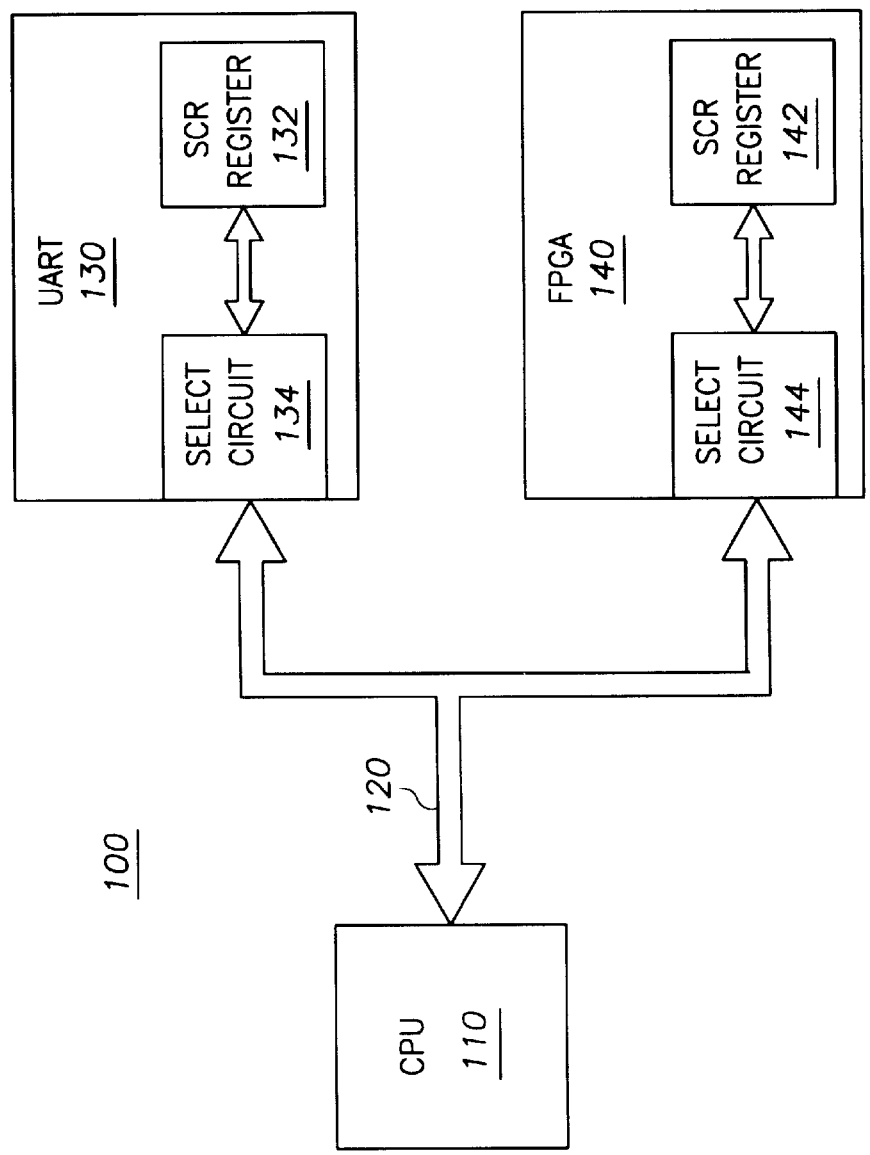
FIG. 1 is a block diagram of an arrangement of integrated circuit devices that includes at least one reconfigurable integrated circuit responsive to mode-selecting codes, according to an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to a reconfigurable integrated circuit that operates in one of a plurality of modes, including a test mode, in response to mode-selecting data codes presented in a temporary register in the circuit. The present invention is particularly advantageous for, but is not necessarily limited to, UART and FPGA devices; other reconfigurable integrated circuits such as PLDs and MPGAs also realize benefit. While the present invention is not limited to such circuits, an appreciation of various aspects of the invention is best gained through a discussion of various examples using this application.

According to an example embodiment of the present invention, an arrangement of integrated circuits includes a feature-enabled circuit as part of a programmable and semi-programmable chip that is configured and arranged to operate in one of a plurality of modes. In particular, the feature-enabled circuit includes a scratchpad register adapted to store data for temporary use, with each feature (or operating mode) of the feature-enabled circuit being selectable in response to mode-selecting data code. The feature-enabled circuit is adapted to present the mode-selecting data code to the feature-enabled circuit. A selection circuit detects when a series of data writes to the scratchpad register corresponds to an instruction to enable a selected feature of the feature-enabled circuit. In an example application, the consecutive data writes to the scratchpad register reconfigure the feature-enabled circuit to increase the address map space.

In another embodiment, the feature-enabled circuit is a UART circuit that uses its scratchpad register to receive an instruction to enable a flow control circuit. The flow control circuit indicates the flow condition for data passing through the UART's internal FIFO during communication. In various implementations the flow conditions of the UART include one or more of the following: whether the FIFO registers of the serial communication circuit are full or empty; whether the transmit/receive registers have reached an upper or lower threshold level; or whether an error has occurred, due to, for example, the FIFO overflowing or invalid data being drawn from the FIFO. In a related embodiment, the scratchpad receives an instruction to operate the UART with an extendible FIFO.

In another particular embodiment, the integrated circuit arrangement further includes a CPU that is communicatively coupled to the feature-enabled circuit via a parallel data bus. The nonvolatile memory, such as a flash memory or an EPROM, is adapted to store a key code used by the selection circuit to detect the series of data writes to the register.

Referring now to the figures, FIG. 1 is a block diagram of an arrangement 100 of integrated circuit devices that includes reconfigurable integrated circuits responsive to mode-selecting data codes, according to an example embodiment of the present invention. In this example embodiment, arrangement 100 reconfigures an integrated circuit to operate in a test mode or to operate with one or more of a series of features that are enabled in the field.

In this particular example embodiment, arrangement 100 includes a CPU 110 communicatively coupled to a UART circuit 130 and to a field programmable gate array (FPGA) 140 via a parallel data bus 120. CPU 110 is configured to include a memory management unit (not shown) that provides the address, data and control signals for communicating with circuits 130 and 140, respectively. In this example, UART circuit 130 and FPGA 140 are each reconfigurable to operate in different modes depending on a mode-selecting data code received by either circuit via parallel data bus 120.

In one example embodiment, UART circuit 130 operates in either a test mode or in a different operating mode in response to a mode-selecting code received through a temporary storage register 132. In this particular example, register 132 is a scratchpad register that temporarily stores and retrieves bytes of data. A selection circuit 134 transmits the mode-selecting data from CPU 110 to scratchpad register 132. The mode-selecting data passes through selection circuit 134 as a series of data writes to register 132 that correspond to a mode-selecting code, or an instruction, which enables or disables a feature of UART circuit 130. CPU 110 sends a key code (or mode-selecting code) to reconfigure UART circuit 130 by sending consecutive writes to register 132. Selection circuit 134 monitors the consecutive data writes through register 132 to determine which features are enabled/disabled or if UART circuit 130 is to transition to a test mode. In one example application, consecutive writes of "DE-B0-01" enables the extendible flow control circuit of the UART.

In another embodiment, consecutive writes to register 132 reconfigure UART circuit 130 to increase the address map space for the FIFO by "folding" the address map to expose more address map space. Each "folding" of the address map doubles the address map space.

In another example embodiment, consecutive writes to register 132 correspond to a different code that transitions the UART into either a test mode or a diagnostic mode.

In another example embodiment, FPGA circuit 140 is configured to include a temporary register 142 and a selection circuit 144 that reconfigures circuit 140 to operate in different modes. Similar to the previously discussed example of UART circuit 130, a selection circuit 144 transmits the mode-selecting data from CPU 110 to a common register 142. Corresponding to a mode-selecting code, the mode-selecting data passes through selection circuit 144 as a series of data writes to register 142. In this example, the mode-selecting code is an instruction that enables or leaves disabled certain logic circuits within FPGA circuit 140. CPU 110 sends a key code to reconfigure FPGA circuit 140 by sending consecutive writes to register 142. Selection circuit 144 monitors the consecutive data writes through register 142 to determine which logic circuits are enabled or left disabled.

Figure 2:
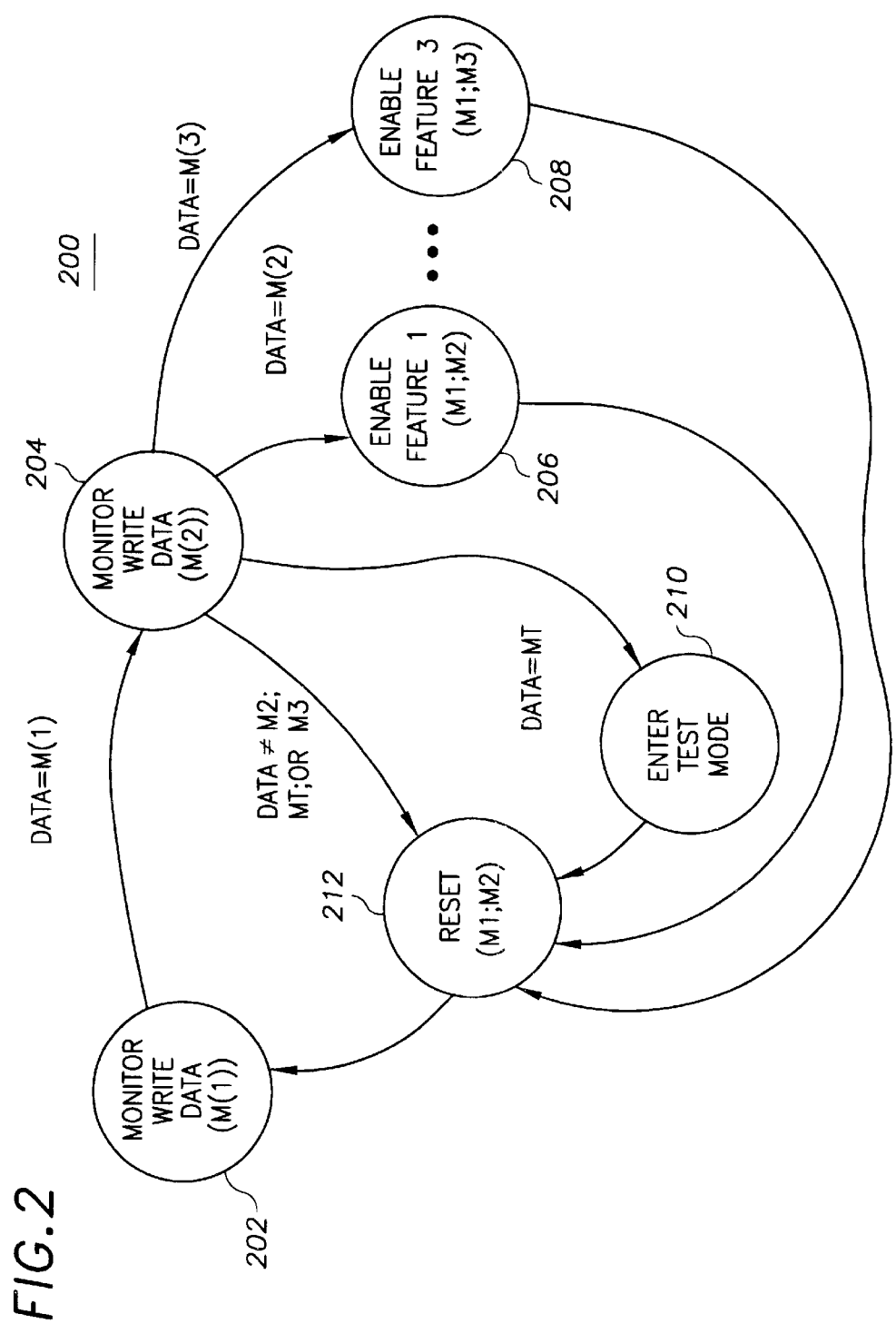
FIG. 2 is a diagram of a finite state machine exhibiting the writing of mode-selecting data into a temporary register, according to another example embodiment of the present invention.

Referring now to FIG. 2, a diagram of a finite state machine (FSM) 200 illustrates the process of writing mode-selecting data into a temporary register, according to another example embodiment of the present invention. For purposes of the following examples, a two-part code is used as an example mode-selecting data code. However, the mode-selecting code is not necessarily limited to a two-part code and can include codes of varying length that reference an instruction for reconfiguring the various circuits previously described.

In this example, at state 202 of FSM 200, selection circuit 134 monitors data writes to detect the first part of a two-part mode-selecting code (e.g, M(1), M(2)) as the data is being written to a register 132. In the initial state, selection circuit 134 and register 132 verify that the data written (representing the first part of the mode-selecting code) is correct (i.e, DATA=M(1)). Once the first part of the code is verified as being correct, FSM 200 transitions to state 204 where register 132 and circuit 134 monitor and verify that the data written (representing the second part of the mode-selecting code) is correct (i.e, DATA=M(2)). Monitoring at state 204 continues until the second part of the two-part code is verified as being correct. In this example, once the two-part code is verified as being correct FSM 200 transitions to state 206. At state 206, the first feature of UART circuit 130 is enabled because register 132 and circuit 134 received the correct mode-selecting code for enabling the first feature of the UART circuit. After enabling the first feature, FSM 200 transitions from state 206 to state 212, where register 132 and circuit 134 reset the two-part code (M1, M2). After resetting the two-part code, FSM 200 transitions from state 212 to state 202 where monitoring for a new mode-selecting code commences once again.

In a related embodiment, at state 208, a third feature of UART circuit 130 is enabled upon register 132 and circuit 134 receiving the correct mode-selecting code. Once the feature is enabled, FSM 200 transitions to state 212 and then to state 202, where register 132 and circuit 134 reset the two-part code and monitoring for a new mode-selecting code commences, respectively.

In another embodiment, register 132 and circuit 134 monitor and verify the mode-selecting code for reconfiguring the feature-enabled circuit to operate in a test mode (e.g., DATA=M(T)). Upon verifying the test mode code at states 202 and 204 (DATA=M(T)), the feature-enabled circuit is reconfigured into the test mode at state 210. After reconfiguring into the test mode, FSM 200 transitions from state 210 to state 212 to reset the two-part code and then to state 202 to commence monitoring data writes to register 132. In this example, the feature-enabled circuit continues in the test mode until selection circuit 134 detects another mode-selecting code that reconfigures the feature-enabled circuit to operate in a new mode.

In most of the above examples, the feature-enabled circuit has a security feature to prevent unauthorized reconfiguration. In a particular embodiment, the feature-enabled circuit cannot be reconfigured where the selection circuit and the register do not detect a recognizable mode-selecting data code (i.e., DATA does not equal M(2); M(T); or M(3)) at either state 202 or state 204. In this example embodiment, where neither part of the code is verified as being correct at both state 202 and state 204, FSM 200 transitions from state 204 to state 212 such that M(1) and M(2) are each reset to their initial states. At state 202, monitoring at selection circuit 134 restarts for mode-selecting data codes being written to register 132.

Several of the above embodiments can be implemented by modifying commercially available UART devices to include the above-described operation. For further details on such commercially-available components and their modes of operation, reference may be made to Product Specifications, No. 853-1585-23061 (Jan. 31, 2000) and No. 853-1078-19971 (Sep. 4, 1998), for UART part numbers SCC2691AC1A28 and SC26C92A1A; each being commercially available from Philips Semiconductor and incorporated herein by reference.

It will also be appreciated that the above-described aspects of the present invention can be combined structurally and/or functionally with one or more of the aspects described in concurrently—filed U.S. application Ser. No. 09/870,917 (VLSI.315PA), Ser. No. 09/870,918 (VLSI.316PA), and Ser. No. 09/871,027 (VLSI.318PA).

While the present invention has been described with reference to several particular example embodiments, those skilled in the art will recognize that many changes may be made thereto without departing from the spirit and scope of the present invention, which is set forth in the following claims.

What is claimed is:

1. An arrangement of integrated circuits, comprising:
   a reconfigurable integrated circuit including a universal asynchronous receiver/transmitter that is configured and arranged to operate in one of a plurality of data communication modes and including a register adapted to store data for temporary use, each data communication mode being selectable in response to mode-selecting data code;
   an interface circuit electrically connected to the reconfigurable integrated circuit and adapted to present the mode-selecting data code to the reconfigurable integrated circuit; and
   a selection circuit adapted to enable the mode-selecting data to be passed from the interface circuit to the reconfigurable integrated circuit, the selection circuit adapted to detect when a series of data writes to the register corresponds to the mode-selecting data code and, in response, reconfiguring the integrated circuit to operate in one of the plurality of data communication modes.

2. The arrangement of claim 1, wherein the register is commonly used in multiple ones of the plurality of modes.

3. The arrangement of claim 2, wherein the reconfigurable integrated circuit is a universal asynchronous receiver/transmitter, and the register is a scratchpad register.

4. The arrangement of claim 1, wherein the reconfigurable integrated circuit includes a field-programmable gate array.

5. The arrangement of claim 1, wherein the selection circuit is further adapted to detect when a series of data writes to the register corresponds to a test mode for the integrated circuit.

6. The arrangement of claim 1, wherein the selection circuit is further adapted to detect when a series of data writes to the register corresponds to an instruction to enable a mode for the integrated circuit.

7. The arrangement of claim 1, wherein the selection circuit is further adapted to detect when a series of data writes to the register corresponds to an instruction to disable a mode for the integrated circuit.

8. An arrangement of integrated circuits comprising:
   a reconfigurable integrated circuit including a universal asynchronous receiver/transmitter; configured and arranged to operate in one of a plurality of modes and including a register where the register is a scratchpad register adapted to store data for temporary use, each mode being selectable in response to mode-selecting data code, and wherein the universal asynchronous receiver/transmitter includes an extendible FIFO having one of a plurality of sizes selectable by the mode-selecting data;
   an interface circuit electrically connected to the reconfigurable integrated circuit and adapted to present the mode-selecting data code to the reconfigurable integrated circuit; and a selection circuit adapted to enable the mode-selecting data to be passed from the interface circuit to the reconfigurable integrated circuit, the selection circuit adapted to detect when a series of data writes to the register corresponds to the mode-selecting data code and, in response, reconfiguring the integrate circuit to operate in one of the plurality of modes.

9. The arrangement of claim 1, wherein the reconfigurable integrated circuit is a universal asynchronous receiver/transmitter, the register is a scratchpad register and the selection circuit is further adapted to detect when a series of data writes to the register corresponds to an instruction to disable a mode for the integrated circuit.

10. An arrangement of integrate circuits, comprising:
    a reconfigurable integrated circuit including a universal asynchronous receiver/transmitter; configured and arranged to operate in one of a plurality of modes and including a register where the register is a scratchpad register adapted to store data for temporary use, each mode being selectable in response to mode-selecting data code and wherein (the universal asynchronous receiver/transmitter includes a flow-control circuit adapted to be enabled by the mode-selecting data;
    an interface circuit electrically connected to the reconfigurable integrated circuit and adapted to present the mode-selecting data code to the reconfigurable integrated and a selection circuit adapted to enable the mode-selecting data to be passed from the interface circuit to the reconfigurable integrated circuit, the selection circuit adapted to detect when a series of data writes to the registers corresponds to the mode-selecting data code and, in response, reconfiguring the integrated circuit to operate in one of the plurality of modes.

11. An arrangement of integrated circuits comprising:

a reconfigurable integrated circuit including a universal asynchronous receiver/transmitter; configured and arranged to operate in one of a plurality of modes and including a register where the register is a scratchpad register adapted to stow data for temporary use, each mode being selectable in response to mode-selecting data code, and wherein the universal asynchronous receiver/transmitter includes an extendible Hit having one of a plurality of sizes selectable by the mode-selecting data, and wherein the universal asynchronous receiver/transmitter includes a flow control circuit adapted to be enabled by the mode-selecting data and to indicate at least one flow-status condition of the FIFO;

an interface circuit electrically connected to the reconfigurable integrated circuit and adapted to present the mode-selecting data code to the reconfigurable integrated circuit; and a selection circuit adapted to enable the mode-selecting data to be passed from the interface circuit to the reconfigurable integrated circuit the selection circuit adapted to detect when a series of data writes to the register corresponds to the mode-selecting data code and, in response, reconfiguring integrated circuit to operate in one of the plurality of modes.

12. The arrangement of claim 11, further including a parallel data bus, and a CPU that is communicatively coupled to the universal asynchronous receiver/transmitter via the parallel data bus.

13. The arrangement of claim 12, wherein the interface circuit is adapted to couple the universal asynchronous receiver/transmitter to the parallel data bus for communication with the CPU, and wherein the universal asynchronous receiver/transmitter further includes a nonvolatile memory adapted to store a key code used by the selection circuit to detect the series of data writes to the register.

14. An arrangement of integrated circuits, comprising:

a reconfigurable integrated circuit including a universal asynchronous receiver/transmitter that is configured and arranged to operate in one of a plurality of data communication modes and including storage means for storing data temporarily, each data communication mode being selectable in response to mode-sub tag data code;

interface means, electrically connected to the reconfigurable integrated circuit, for presenting the mode-selecting data rode to the reconfigurable integrated circuit; and means for enabling the mode-selecting data to be passed from the interface circuit to the reconfigurable integrated circuit, and for detecting when a series of data writes to the register corresponds to the mode-selecting data code and, in response, reconfiguring the integrated circuit to operate in one of the plurality of data communication modes.

* * * * *